United States Patent
Hakozaki et al.

(10) Patent No.: US 12,527,730 B1
(45) Date of Patent: Jan. 20, 2026

(54) SKIN CARE COMPOSITIONS AND METHODS OF USING THE SAME

(71) Applicant: The Procter & Gamble Company, Cincinnati, OH (US)

(72) Inventors: Tomohiro Hakozaki, Cincinnati, OH (US); Leo Timothy Laughlin, II, Mason, OH (US); Jiazhen Wang, Dayton, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 19/193,303

(22) Filed: Apr. 29, 2025

(30) Foreign Application Priority Data

Jan. 29, 2025 (CA) ...................... 3263584

(51) Int. Cl.
| | | |
|---|---|---|
| *A61K 8/64* | (2006.01) | |
| *A61K 8/60* | (2006.01) | |
| *A61K 8/67* | (2006.01) | |
| *A61K 8/88* | (2006.01) | |
| *A61P 19/00* | (2006.01) | |
| *A61P 19/08* | (2006.01) | |
| *A61Q 17/04* | (2006.01) | |
| *A61Q 19/00* | (2006.01) | |
| *A61Q 19/02* | (2006.01) | |
| *A61Q 19/08* | (2006.01) | |
| *A61Q 19/10* | (2006.01) | |

(52) U.S. Cl.
CPC ................ *A61K 8/64* (2013.01); *A61K 8/675* (2013.01); *A61Q 19/007* (2013.01); *A61Q 19/02* (2013.01); *A61Q 19/10* (2013.01)

(58) Field of Classification Search
CPC .......... A61K 8/64; A61K 8/342; A61K 8/375; A61K 8/60; A61K 6/675; A61K 8/88; A61Q 17/04; A61Q 19/02; A61Q 19/00; A61Q 19/08; A61P 19/00

See application file for complete search history.

(56) References Cited

U.S. PATENT DOCUMENTS

| | | |
|---|---|---|
| 11,807,603 B2 | 11/2023 | Von Hof et al. |
| 2012/0244094 A1 | 9/2012 | Farwick et al. |
| 2013/0236561 A1 | 9/2013 | Meyer et al. |
| 2013/0315849 A1 | 11/2013 | Farwick et al. |
| 2021/0030640 A1 * | 2/2021 | Kim ................... A61Q 19/00 |
| 2023/0023141 A1 | 1/2023 | Von Hof et al. |
| 2023/0312791 A1 | 10/2023 | Amajjahe et al. |
| 2024/0066086 A1 | 2/2024 | Wang et al. |

FOREIGN PATENT DOCUMENTS

| | | | | |
|---|---|---|---|---|
| CN | 116983237 | * | 11/2023 | ............. A61Q 19/02 |
| WO | WO-2015011311 A1 | * | 1/2015 | ............. A61K 8/347 |

* cited by examiner

*Primary Examiner* — Julie Ha
(74) *Attorney, Agent, or Firm* — Alexandra S. Anoff

(57) ABSTRACT

A skin care composition that contains a combination of a vitamin B3 compound, nicotinoyl tetrapeptide-30 (N-PKEK) [SEQ ID NO: 1], and a dermatologically acceptable carrier is described. The combination of N-PKEK [SEQ ID NO: 1] and vitamin B3 compound synergistically exhibits a dendricity reduction and exhibits a synergy factor greater than 1.

15 Claims, 1 Drawing Sheet
Specification includes a Sequence Listing.

SKIN CARE COMPOSITIONS AND METHODS OF USING THE SAME

FIELD OF THE INVENTION

The present disclosure is directed generally to improving skin health with a synergistic combination of skin care actives. More specifically, the present disclosure is directed to a combination of a vitamin $B_3$ compound and nicotinoyl tetrapeptide-30 (N-PKEK) [SEQ ID NO: 1], particularly N-PKEK in the acid and/or amide form, that synergistically regulates melanin activity at a cellular level.

SEQUENCE LISTING

An official copy of the sequence listing is submitted concurrently with the specification electronically as an ST.26 formatted sequence listing with a file name of "16859F-Sequence.txt", a creation date of Jan. 23, 2025, and a size of 707 bytes. The sequence listing contained in this ST.26 formatted document is part of the specification and is herein incorporated by reference in its entirety.

BACKGROUND OF THE INVENTION

The demand for effective skin care solutions has surged in recent years, driven by increasing awareness of skin health and aesthetics. Among the most common skin concerns faced by individuals of all ages and skin types are hyperpigmentation and the presence of spots, which can arise from various factors, including sun exposure, hormonal changes, aging, and environmental stressors. These spots, often referred to as age spots, sun spots, or dark spots, can lead to a decrease in overall satisfaction with one's appearance.

Current products typically include a range of topical agents, such as hydroquinone, kojic acid, and various alpha hydroxy acids (AHAs), aimed at reducing the appearance of skin discoloration. While some of these products demonstrate efficacy in lightening spots, they may also come with significant drawbacks, including potential skin irritation, allergic reactions, or even long-term damage with prolonged use. Furthermore, many existing formulations lack a comprehensive approach that addresses the underlying causes of hyperpigmentation, leading to only temporary results.

Consequently, there is a growing need for topical skin care products that not only target spots without causing irritation, but also work to restore skin health at a cellular level. Peptides can help reduce the appearance of spots and discoloration by regulating melanocyte dendricity. N-PKEK [SEQ ID NO: 1] in both the acid (N-PKEK-acid has a —CO attached to the lysine) and amide (N-PKEK-amide has an —NH attached to the lysine) form are promising candidates for formulation in skin care products aimed at reducing spots and promoting a more even complexion. However, N-PKEK [SEQ ID NO: 1] has poor skin penetration and bioavailability due to its large molecular mass and hydrophilic nature, which limits its efficacy when applied topically.

Therefore, there is also a need to identify compounds and methods that improve the efficacy of N-PKEK [SEQ ID NO: 1] and regulate melanin activity at a cellular level.

SUMMARY OF THE INVENTION

A skin care composition comprising: (a) a combination of niacinamide and nicotinoyl tetrapeptide-30 (N-PKEK) [SEQ ID NO: 1] at a weight ratio of the niacinamide to the N-PKEK from about 1000:1 to about 5000:1; and (b) a dermatologically acceptable carrier; wherein at least a portion of the N-PKEK [SEQ ID NO: 1] comprises nicotinoyl tetrapeptide-30 acid (N-PKEK-acid); and wherein the combination of N-PKEK [SEQ ID NO: 1] and niacinamide synergistically exhibits a dendricity reduction and exhibits a synergy factor greater than 1.

A skin care composition comprising: (a) a combination of a vitamin $B_3$ compound and nicotinoyl tetrapeptide-30 (N-PKEK) [SEQ ID NO: 1], derivatives thereof, or mixtures thereof, at a weight ratio of the vitamin $B_3$ compound to the N-PKEK [SEQ ID NO: 1] from about 100:1 to about 100,000:1; and (b) a dermatologically acceptable carrier; wherein the combination of N-PKEK [SEQ ID NO: 1] and vitamin B3 compound synergistically exhibits a dendricity reduction and exhibits a synergy factor greater than 1.

BRIEF DESCRIPTION OF THE DRAWINGS

While the specification concludes with claims particularly pointing out and distinctly claiming the subject matter of the present invention, it is believed that the invention can be more readily understood from the following description taken in connection with the accompanying drawings, in which:

DETAILED DESCRIPTION OF THE INVENTION

There is consumer demand for effective topical skin care products that reduce hyperpigmentation and dark spots caused by factors such as sun exposure, hormonal changes, and aging without causing irritation by addressing the issue at a cellular level. Peptides, particularly nicotinoyl tetrapeptide-30 (N-PKEK) [SEQ ID NO: 1], show promise in regulating melanin activity to promote a more even complexion; however, their effectiveness is limited by poor skin penetration and bioavailability due to their large molecular size. It was surprisingly found that combining a vitamin $B_3$ compound and N-PKEK [SEQ ID NO: 1] and derivatives thereof, particularly the acid and/or amide forms, at certain ratios can synergistically inhibit melanocyte dendricity.

Melanocytes, the cells responsible for producing melanin, have dendritic (branch-like) processes that transport melanin to keratinocytes, which are the main cells in the outer layer of the skin. This transfer of melanin allows for pigmentation in the surrounding skin cells. When melanocytes exhibit more dendritic processes, they can distribute melanin more effectively, resulting in more noticeable spots on the skin's surface. Research has shown that the dendricity of melanocytes is greater in facial spots compared to the adjacent skin, as noted in the study by Hakozaki et al. (2022) titled "Morphological and Transcriptional Evaluation of Multiple Facial Cutaneous Hyperpigmented Spots," available through U.S. National Library of Medicine's PubMed®. Conversely, when the dendricity of melanocytes is reduced, the skin tends to have a more uniform tone and fewer unwanted dark spots.

Figure 1:
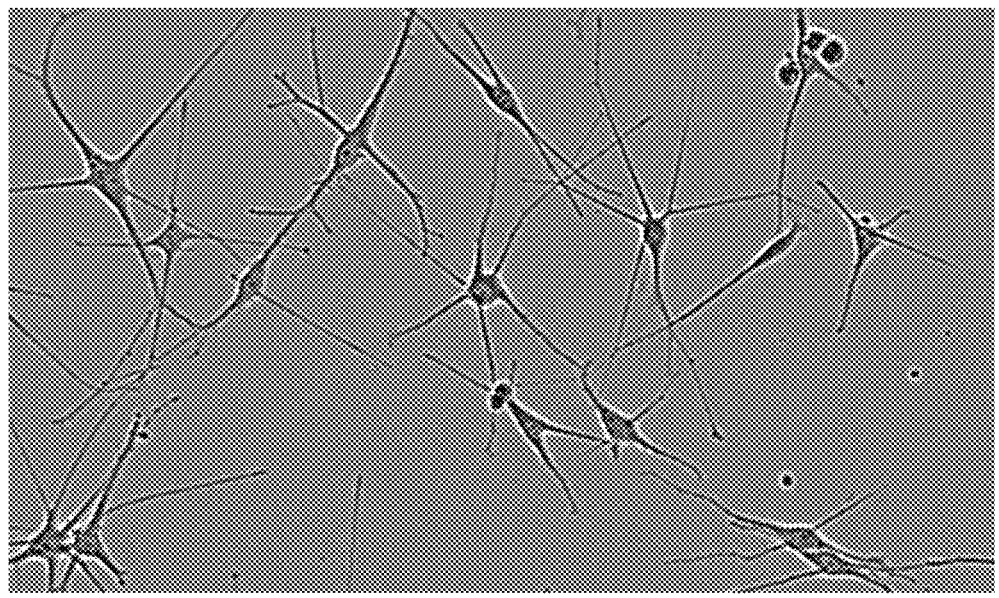
FIG. 1 is an image of untreated melanocytes.
Figure 2:
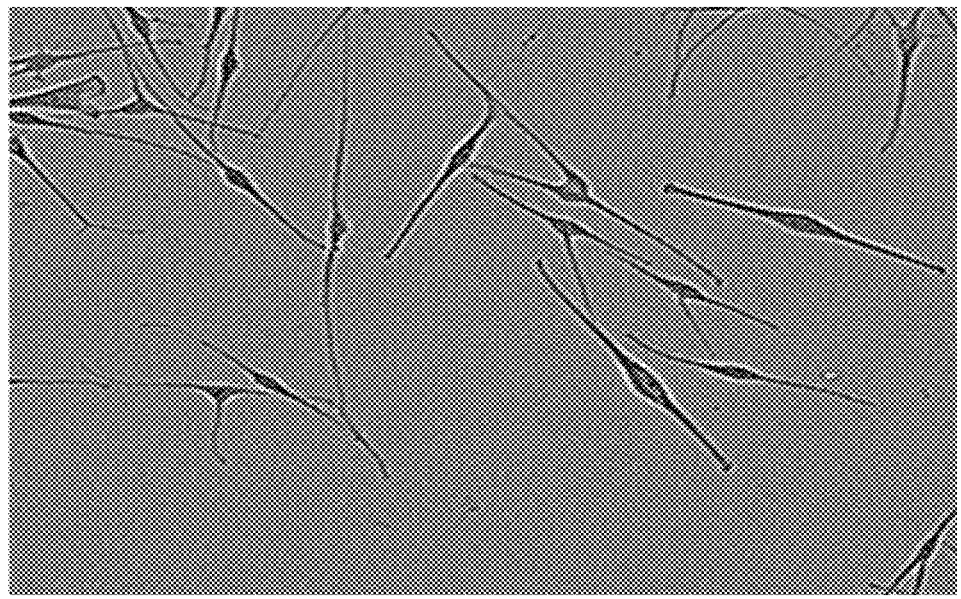
FIG. 2 is an image of melanocytes treated with 50 ppm niacinamide and 0.05 ppm N-PKEK-acid.

FIG. 1 shows an image of untreated melanocytes. Most of the melanocytes in FIG. 1 have several dendritic processes. FIG. 2 shows an image of melanocytes treated with 50 ppm niacinamide and 0.05 ppm N-PKEK-acid and the melanocytes have significantly fewer dendritic processes, as compared to FIG. 1.

Table 1 and Table 2, below, used the Melanocyte Dendricity Test Method, described hereafter, to demonstrate the ability of a combination of niacinamide (N), a vitamin $B_3$ compound, and N-PKEK [SEQ ID NO: 1] in the acid form (Table 1) and the amide form (Table 2) to synergistically reduce the dendricity of melanocytes. The samples were prepared as described hereafter in the Melanocyte Dendricity Test Method.

The Synergy Factor is calculated as:

$$\frac{\text{Observed Dendricity Reduction}}{\text{Sum of the Individual Ingredient Dendricity Reduction}}$$

A synergy factor greater than 1.00 suggests that the combination has a synergistic effect. Additionally, if the synergy factor is greater than 1.00 and the p-value is less than or equal to 0.05, this indicates that the synergistic effect is statistically significant. The synergy factor can be greater than 1.0, alternatively ≥1.1, alternatively ≥1.15, alternatively ≥1.2, and alternatively ≥1.25.

As can be seen in Table 1, the data suggests that ratios of niacinamide to N-PKEK [SEQ ID NO: 1] in the acid form of 10:1 to 100,000:1 synergistically reduce melanocyte dendricity. Thus, it can be important to select the right combination of vitamin $B_3$ compound to N-PKEK [SEQ ID NO: 1], to provide the desired synergistic effect.

TABLE 1

| Ratio | Treatment Level | | Dendricity Reduction (%) | | | Synergy |
|---|---|---|---|---|---|---|
| N:N-PKEK | N | N-PKEK | N | N-PKEK | N + N-PKEK | Factor |
| 10 | 50 ppm (0.005%) | 5 ppm | 0 | 44 | 45 | 1.02 |
| 100 | 50 ppm (0.005%) | 0.5 ppm | 0 | 25 | 32.1 | 1.28* |
| 1000 | 50 ppm (0.005%) | 0.05 ppm | 0 | 3.8 | 19.2 | 5.05* |
| 10000 | 50 ppm (0.005%) | 50 ppm | 0 | 1 | 1 | 1 |
| 100 | 500 ppm (0.05%) | 5 ppm | 2.3 | 44 | 51 | 1.1 |
| 1000 | 500 ppm (0.05%) | 0.5 ppm | 2.3 | 25 | 36.7 | 1.34* |
| 10000 | 500 ppm (0.05%) | 0.05 ppm | 2.3 | 3.8 | 22.4 | 3.67* |
| 100000 | 500 ppm (0.05%) | 0.005 ppm | 2.3 | 1 | 4.6 | 1.39* |
| 50 | 250 ppm (0.025%) | 5 ppm | 0 | 44 | 45 | 1.02 |
| 500 | 250 ppm (0.025%) | 0.5 ppm | 0 | 25 | 34 | 1.36* |
| 5000 | 250 ppm (0.025%) | 0.05 ppm | 0 | 3.8 | 4 | 1.05 |
| 50000 | 250 ppm (0.025%) | 0.005 ppm | 0 | 1 | 1 | 1 |
| 250 | 125 ppm (0.0125%) | 0.5 ppm | 0 | 25 | 31 | 1.24* |
| 125 | 62 ppm (0.0062%) | 0.5 ppm | 0 | 25 | 27 | 1.08 |

*Indicates the p-value is ≤ 0.05

As can be seen in Table 2, below, the data suggest that ratios of niacinamide to N-PKEK [SEQ ID NO: 1] in the amide form of 10:1 to 100,000:1 synergistically reduce melanocyte dendricity. Thus, it can be important to select the right combination of vitamin $B_3$ compound to N-PKEK [SEQ ID NO: 1], to provide the desired synergistic effect.

TABLE 2

| Ratio | Treatment Level | | Dendricity Reduction (%) | | | Synergy |
|---|---|---|---|---|---|---|
| N:N-PKEK | N | N-PKEK | N | N-PKEK | N + N-PKEK | Factor |
| 10 | 50 ppm (0.005%) | 5 ppm | 0 | 44 | 45 | 1.02 |
| 100 | 50 ppm (0.005%) | 0.5 ppm | 0 | 25 | 32.1 | 1.31* |
| 1000 | 50 ppm (0.005%) | 0.05 ppm | 0 | 3.8 | 19.2 | 4.13* |
| 10000 | 50 ppm (0.005%) | 50 ppm | 0 | 2 | 3 | 1.5 |

TABLE 2-continued

| Ratio | Treatment Level | | Dendricity Reduction (%) | | | Synergy |
|---|---|---|---|---|---|---|
| N:N-PKEK | N | N-PKEK | N | N-PKEK | N + N-PKEK | Factor |
| 100 | 500 ppm (0.05%) | 5 ppm | 2.3 | 44 | 51 | 1.1 |
| 1000 | 500 ppm (0.05%) | 0.5 ppm | 2.3 | 25 | 36.7 | 1.45* |
| 10000 | 500 ppm (0.05%) | 0.05 ppm | 2.3 | 3.8 | 22.4 | 4.37* |
| 100000 | 500 ppm (0.05%) | 0.005 ppm | 2.3 | 1 | 4.6 | 2.8* |
| 50 | 250 ppm (0.025%) | 5 ppm | 0 | 44 | 45 | 1.04 |
| 500 | 250 ppm (0.025%) | 0.5 ppm | 0 | 26 | 34 | 1.35* |
| 5000 | 250 ppm (0.025%) | 0.05 ppm | 10 | 5.4 | 9.8 | 1.81* |
| 50000 | 250 ppm (0.025%) | 0.005 ppm | 0 | 2 | 2 | 1 |
| 250 | 125 ppm (0.0125%) | 0.5 ppm | 0 | 26 | 31 | 1.19* |
| 125 | 62 ppm (0.0062%) | 0.5 ppm | 10 | 26 | 29 | 1.12 |

*Indicates the p-value is ≤ 0.05

The combination of niacinamide and nicotinoyl tetrapeptide-30 (N-PKEK) [SEQ ID NO: 1] and derivatives thereof can be in a cosmetic product including a face wash, body wash, and/or leave-on skin care product such as a moisturizer including but not limited to creams, lotions, and gel creams and/or treatment products including but not limited to serums, toners, and essences. The skin care product can help provide spot fading, tone brightening, and/or tone evenness. The skin care product can also prevent pigmentation and/or hyper-pigmentation. The skin care product can help stabilize dendricity enabling melanin inhibition and provide other tone related benefits.

The present skin care compositions can contain a safe and effective amount of a vitamin B3 compound and nicotinoyl tetrapeptide-30 (N-PKEK) [SEQ ID NO: 1] and derivatives thereof, particularly the acid and amide forms. An effective amount of these two ingredients in combination can synergistically reduce melanocyte density, which is important for reducing the appearance of spots, brightening and/or evening tone, and preventing pigmentation and/or hyper-pigmentation.

Vitamin $B_3$ Compound

The compositions herein can include a safe and effective amount of a vitamin $B_3$ compound. The composition can contain from about 0.1% to about 10%, alternatively from about 0.5% to about 8%, alternatively from about 1% to about 7% of a vitamin B3 compound, alternatively from about 1% to about 6%, alternatively from about 2% to about 5%, alternatively from about 1% to about 5%, and alternatively from about 3% to about 4%. The vitamin B3 compound can be niacinamide.

As used herein, "vitamin $B_3$ compound" means a compound having the formula:

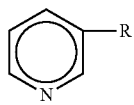

Where: R is $CONH_2$ (i.e., niacinamide), COOH (i.e., nicotinic acid) or $CH_2OH$ (i.e., nicotinyl alcohol); derivatives thereof; and salts of any of the foregoing.

Exemplary derivatives of vitamin $B_3$ compounds include nicotinic acid esters, including non-vasodilating esters of nicotinic acid (e.g., tocopheryl nicotinate, myristyl nicotinate) nicotinamide riboside, nicotinyl amino acids, nicotinyl alcohol esters of carboxylic acids, nicotinic acid N-oxide, and niacinamide N-oxide.

Tetrapeptide

The compositions herein include a safe and effective amount of N-PKEK [SEQ ID NO: 1](INCI: nicotinoyl tetrapeptide-30) and derivatives thereof. The N-PKEK can be in acid and/or amide form and/or salts thereof. The N-PKEK may be present at from about 0.01 ppm to about 100 ppm, alternatively from about 0.1 ppm to about 75 ppm, alternatively from about 1 ppm to about 50 ppm, alternatively from about 5 ppm to about 50 ppm, alternatively from about 10 ppm to about 50 ppm, and alternatively from about 10 ppm to about 30 ppm. The N-PKEK may be present in the compositions at from about 0.01 ppm to about 25 ppm, alternatively from about 0.05 ppm to about 20 ppm, from about 0.1 ppm to about 10 ppm, from about 0.2 ppm to about 10 ppm, from about 0.3 ppm to about 10 ppm, from about 0.5 ppm to about 10 ppm, from about 1 ppm to about 10 ppm, and alternatively from about 1 ppm to about 5 ppm.

Ratio of Vitamin $B_3$ Compound to Tetrapeptide

The vitamin $B_3$ compound and nicotinoyl tetrapeptide-30 (N-PKEK) [SEQ ID NO: 1](INCI: nicotinoyl tetrapeptide-30) can be provided at a certain ratio to provide synergy. The ratio of vitamin $B_3$ to N-PKEK can be from about 10:1 to 100,000:1, alternatively from about 50:1 to about 50,000:1, alternatively from about 100:1 to about 10,000:1, alternatively from about 250:1 to about 10,000:1, alternatively from about 500:1 to about 5000:1, alternatively from about 125:1 to about 5000:1, alternatively from about 500:1 to about 5000:1, alternatively from about 1000:1 to about 5000:1.

Dermatologically Acceptable Carrier

The compositions herein include a dermatologically acceptable carrier (which may be referred to as a "carrier"). The phrase "dermatologically acceptable carrier" means that the carrier is suitable for topical application to the keratinous tissue, has good aesthetic properties, is compatible with the actives in the composition, and will not cause any unreasonable safety or toxicity concerns. The carrier can be present at a level of from about 50% to about 99%, about 60% to about 98%, about 70% to about 98%, or, alternatively, from about 80% to about 95%, by weight of the composition.

The carrier can be in a wide variety of forms. In some instances, the solubility or dispersibility of the components (e.g., extracts, sunscreen active, additional components) may dictate the form and character of the carrier. Nonlimiting examples include simple solutions (e.g., aqueous or anhydrous), dispersions, emulsions, and solid forms (e.g., gels, sticks, flowable solids, or amorphous materials). In some instances, the dermatologically acceptable carrier is in the form of an emulsion that has a continuous aqueous phase (e.g., an oil-in-water or water-in-oil-in-water emulsion) or a continuous oil phase (e.g., water-in-oil or oil-in-water-in-oil emulsion). The oil phase of the emulsion may include silicone oils, non-silicone oils such as hydrocarbon oils, esters, ethers, and mixtures thereof. The aqueous phase may include water and water-soluble ingredients (e.g., water-soluble moisturizing agents, conditioning agents, anti-microbials, humectants and/or other skin care actives). In some instances, the aqueous phase may include components other than water, including but not limited to water-soluble moisturizing agents, conditioning agents, anti-microbials, humectants and/or other water-soluble skin care actives. In some instances, the non-water component of the composition comprises a humectant such as glycerin and/or other polyol(s).

In some instances, the compositions herein are in the form of an oil-in-water ("O/W") emulsion that provides a sensorial feel that is light and non-greasy. Suitable O/W emulsions herein may include a continuous aqueous phase of more than 50% by weight of the composition, and the remainder being the dispersed oil phase. The aqueous phase may include 1% to 99% water, based on the weight of the aqueous phase, along with any water soluble and/or water miscible ingredients. In these instances, the dispersed oil phase will typically be present at less than 30% by weight of composition (e.g., 1% to 20%, 2% to 15%, 3% to 12%, 4% to 10%, or even 5% to 8%) to help avoid some of the undesirable feel effects of oily compositions. The oil phase may include one or more volatile and/or non-volatile oils (e.g., botanical oils, silicone oils, and/or hydrocarbon oils). Some nonlimiting examples of oils that may be suitable for use in the present compositions are disclosed in U.S. Pat. No. 9,446,265 and U.S. Publication No. 2015/0196464.

The carrier may contain one or more dermatologically acceptable diluents. As used herein, "diluent" refers to materials in which the skin care actives herein can be dispersed, dissolved, or otherwise incorporated. Some nonlimiting examples of hydrophilic diluents include water, organic hydrophilic diluents such as lower monovalent alcohols (e.g., $C_1$-$C_4$) and low molecular weight glycols and polyols, including propylene glycol, polyethylene glycol (e.g., molecular weight of 200 to 600 g/mole), polypropylene glycol (e.g., molecular weight of 425 to 2025 g/mole), glycerol, butylene glycol, 1,2,4-butanetriol, sorbitol esters, 1,2,6-hexanetriol, ethanol, isopropanol, sorbitol esters, butanediol, ether propanol, ethoxylated ethers, propoxylated ethers and combinations thereof.

Conditioning Agents

The compositions herein may include 0.1% to 50% by weight of a conditioning agent (e.g., 0.5% to 30%, 1% to 20%, or even 2% to 15%). Adding a conditioning agent can help provide the composition with desirable feel properties (e.g., a silky, lubricious feel upon application). Some non-limiting examples of conditioning agents include, hydrocarbon oils and waxes, silicones, fatty acid derivatives, cholesterol, cholesterol derivatives, diglycerides, triglycerides, vegetable oils, vegetable oil derivatives, acetoglyceride esters, alkyl esters, alkenyl esters, lanolin, wax esters, beeswax derivatives, sterols and phospholipids, salts, isomers and derivatives thereof, and combinations thereof. Particularly suitable examples of conditioning agents include volatile or non-volatile silicone fluids such as dimethicone copolyol, dimethylpolysiloxane, diethylpolysiloxane, mixed C1-30 alkyl polysiloxanes, phenyl dimethicone, dimethiconol, dimethicone, dimethiconol, silicone crosspolymers, and combinations thereof. Dimethicone may be especially suitable, since some consumers associate the feel properties provided by certain dimethicone fluids with good moisturization. Other examples of silicone fluids that may be suitable for use as conditioning agents are described in U.S. Pat. No. 5,011,681.

Rheology Modifiers

The compositions herein may include 0.1% to 5% of a rheology modifier (e.g., thickening agent) to provide the composition with suitable rheological and skin feels properties. Some non-limiting examples of thickening agents include crosslinked polyacrylate polymers, polyacrylamide polymers, polysaccharides, gums and mixtures thereof. In a particularly suitable example, the composition may include a superabsorbent polymer thickening agent such as sodium polyacrylate, starch grafted sodium polyacrylate, or a combination of these. Some non-limiting examples of superabsorbent polymer thickeners are described in, for example, U.S. Pat. No. 9,795,552.

Some consumers find compositions that use silicone fluids as conditioning agents to be undesirably greasy or heavy feeling. Thus, it may be desirable to provide a composition that is free of or substantially free of silicone fluid. It may also be desirable to tailor a superabsorbent polymer thickener to provide the composition with a light, airy feel, for example, by adjusting the amount of water in the composition, the water:oil ratio (e.g., 12:1 to 1:1), and/or the ratio of water to thickener or oil to thickener.

Emulsifiers

When the dermatologically acceptable carrier is in the form of an emulsion, it may be desirable to include an emulsifier to provide a stable composition (e.g., does not phase separate). When included, the emulsifier may be present at an amount of 0.1% to 10% (e.g., 1% to 5%, or 2%-4%). Emulsifiers may be nonionic, anionic or cationic. Some non-limiting examples of emulsifiers that may be suitable for use herein are disclosed in U.S. Pat. Nos. 3,755,560; 4,421,769; and McCutcheon's Detergents and Emulsifiers, North American Edition, pages 317-324 (1986).

Other Optional Ingredients

The present composition may optionally include one or more additional ingredients commonly used in cosmetic compositions (e.g., colorants, skin care actives, anti-inflammatory agents, sunscreen agents, emulsifiers, buffers, rheology modifiers, combinations of these and the like), provided that the additional ingredients do not undesirably alter the skin health or appearance benefits provided by the present compositions. The additional ingredients, when incorporated into the composition, should be suitable for use in contact with human skin tissue without undue toxicity, incompatibility, instability, allergic response, and the like. Some nonlimiting examples of additional actives include vitamins other than vitamin $B_3$ compounds and/or niacinamide, minerals, peptides and peptide derivatives, sugar amines, sunscreens, oil control agents, particulates, flavonoid compounds, hair growth regulators, anti-oxidants and/or anti-oxidant precursors, preservatives, protease inhibitors, tyrosinase inhibitors, anti-inflammatory agents, moisturizing agents, exfoliating agents, skin lightening agents, sunless tanning agents, lubricants, anti-acne actives, anti-cellulite actives, chelating agents, anti-wrinkle actives, anti-atrophy actives, phytosterols and/or plant hormones, N-acyl amino acid compounds, antimicrobials, and antifungals. Other non-limiting examples of additional ingredients and/or skin care actives that may be suitable for use herein are described in U.S. Publication Nos. 2002/0022040; 2003/0049212; 2004/0175347; 2006/0275237; 2007/0196344; 2008/0181956; 2008/0206373; 2010/00092408; 2008/0206373; 2010/0239510; 2010/0189669; 2010/0272667; 2011/0262025; 2011/0097286; US2012/0197016; 2012/0128683; 2012/0148515; 2012/0156146; and 2013/0022557; and U.S. Pat. Nos. 5,939,082; 5,872,112; 6,492,326; 6,696,049; 6,524,598; 5,972,359; and 6,174,533.

When including optional ingredients in the compositions herein, it may be desirable to select ingredients that do not form complexes or otherwise undesirably interact with other ingredients in the composition, especially pH sensitive ingredients like niacinamide, salicylates and peptides. When present, the optional ingredients may be included at amounts of from 0.0001% to 50%; from 0.001% to 20%; or even from 0.01% to 10% (e.g., 50%, 40%, 30%, 20%, 10%, 5%, 4%, 3%, 2%, 1%, 0.5% or 0.1%), by weight of the composition.

Method of Use

The present method includes identifying a target portion of skin where treatment is desired and applying a composition comprising an effective amount of vitamin $B_3$ compound and N-PKEK [SEQ ID NO: 1] and optionally one or more additional skin care actives, to the target portion of skin. The target portion of skin may be on a facial skin surface such as the forehead, perioral, chin, periorbital, nose, and/or cheek) or another part of the body (e.g., hands, arms, legs, back, chest, underarms, underboobs, feet). The person or target portion of skin in need of treatment may be one that exhibits one or more hyperpigmented spots, uneven tone, and/or skin dullness. In some instances, a target portion of skin may not exhibit one or more hyperpigmented spots, uneven tone, and/or skin dullness, but a user may still wish to treat the portion of skin if it is one that commonly exposed to higher levels of exogenous stressors (e.g., sun exposed skin such as facial skin and arm skin). In this way, the present methods and compositions may be used prophylactically to help delay skin aging including hyperpigmented spots, uneven tone, and/or skin dullness. The composition can be used to treat skin, which can restore skin health at a cellular level and/or provide cosmetic improvements (e.g., reducing appearance of dark spots without causing significant noticeable irritation).

The composition may be applied to a target portion of skin and, if desired, to the surrounding skin at least once a day, twice a day, or on a more frequent daily basis, during a treatment period. When applied twice daily, the first and second applications are separated by at least 1 to 12 hours. Typically, the composition is applied in the morning and/or in the evening before bed. The treatment period herein is ideally of sufficient time for the vitamin $B_3$ compound and N-PKEK [SEQ ID NO: 1] to improve the appearance of the skin. The treatment period may last for at least 1 week (e.g., about 2 weeks, 4 weeks, 8 weeks, or even 12 weeks). In some instances, the treatment period will extend over multiple months (i.e., 3-12 months). In some instances, the composition may be applied most days of the week (e.g., at least 4, 5 or 6 days a week), at least once a day or even twice a day during a treatment period of at least 2 weeks, 4 weeks, 8 weeks, or 12 weeks.

The step of applying the composition may be accomplished by localized application. In reference to application of the composition, the terms "localized", "local", or "locally" mean that the composition is delivered to the targeted area (e.g., a hyperpigmented spot or portion thereof) while minimizing delivery to skin surfaces where treatment is not desired. The composition may be applied and lightly massaged into an area of skin. The form of the composition or the dermatologically acceptable carrier should be selected to facilitate localized application. While certain embodiments herein contemplate applying a composition locally to an area, it will be appreciated that compositions herein can be applied more generally or broadly to one or more skin surfaces. In certain embodiments, the compositions herein may be used as part of a multi-step beauty regimen, wherein the present composition may be applied before and/or after one or more other compositions.

Definitions

"Apply" or "application," as used in reference to a composition or material herein, means to place or spread the composition onto a human skin surface such as the epidermis.

"Derivative" means an acid, amide, ether, ester, amino, carboxyl, acetyl, alcohol derivative, or salts thereof of a given compound.

"Effective amount" means an amount of a compound or composition sufficient to significantly induce a positive benefit to keratinous tissue over the course of a treatment period. The positive benefit may be a health, appearance, and/or feel benefit, including, independently or in combination, the benefits disclosed herein.

"Improve the appearance of" means providing a measurable, desirable change or benefit in skin appearance, which may be quantified, for example, by a decrease in redness, inflammation, and/or plaque scales.

"Skin care" means regulating and/or improving a skin condition. Some nonlimiting examples include improving skin appearance and/or feel by providing a smoother, more even appearance and/or feel; increasing the thickness of one or more layers of the skin; improving the elasticity or resiliency of the skin; improving the firmness of the skin; and reducing the oily, shiny, and/or dull appearance of skin, improving the hydration status or moisturization of the skin, improving the appearance of fine lines and/or wrinkles, improving skin exfoliation or desquamation, plumping the skin, improving skin barrier properties, improve skin tone, reducing the appearance of redness or skin blotches, and/or improving the brightness, radiancy, or translucency of skin; preventing damage to skin via antioxidant approaches, including UV A and UV B induced damage, preventing formation of comedomes, balancing the skin microbiome or preventing acne.

"Skin care active" means a compound or combination of compounds that, when applied to skin, provide an acute and/or chronic benefit to skin or a type of cell commonly found therein. Skin care actives may regulate and/or improve skin or its associated cells (e.g., improve skin elasticity, hydration, skin barrier function, and/or cell metabolism).

"Skin care composition" means a composition that includes a skin care active and regulates and/or improves skin condition.

"Skin cell" refers to the types of cells commonly found in human skin. Non-limiting examples of skin cells are keratinocytes, fibroblasts, melanocytes, Langerhans cells, and Merkel cells.

"Synergy" and variations thereof mean that the cellular anti-oxidancy and repair effect provided by a combination of vitamin $B_3$ and nicotinoyl tetrapeptide-30 [SEQ ID NO: 1] is more than the predicted additive effect of these ingredients alone. For example, synergy is demonstrated when the combination of niacinamide and nicotinoyl tetrapeptide-30 [SEQ ID NO: 1] reduce melanocyte dendricity more than the calculated additive effects of these ingredients individually. Melanocyte Dendricity can be quantitated using the Melanocyte Dendricity Test Method described herein.

As used herein, "treatment period," means the length of time and/or frequency that a material or composition is applied to a target skin surface.

Other than in the operating examples, or where otherwise indicated, all numbers expressing quantities of ingredients and/or reaction conditions are to be understood as being modified in all instances by the term "about" which can encompass ±10%, ±8%, ±6%, ±5%, ±4%, ±3%, ±2%, ±1%, or ±0.5%.

All percentages are by weight of the cosmetic composition, unless specifically stated otherwise. All ratios are weight ratios, unless specifically stated otherwise. All ranges are inclusive and combinable. The number of significant digits conveys neither a limitation on the indicated amounts nor on the accuracy of the measurements. Unless otherwise indicated, all measurements are understood to be made at approximately 21° C. and at ambient conditions, where "ambient conditions" means conditions under about 1 atmosphere of pressure and at about 50% relative humidity. All numeric ranges are inclusive of narrower ranges; delineated upper and lower range limits are interchangeable to create further ranges not explicitly delineated.

It is to be understood that, as used herein the terms "the," "a," or "an," mean "at least one," and should not be limited to "only one" unless explicitly indicated to the contrary.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method that comprises A+B+C include embodiments where a method consists of A+B+C and embodiments where a method consists essentially of A+B+C. As described, the phrase "at least one of A, B, and C" is intended to include "at least one A or at least one B or at least one C," and is also intended to include "at least one A and at least one B and at least one C."

TEST METHODS

Melanocyte Dendricity Test Method

Primary human melanocyte cells (Thermo Fisher Scientific®) were plated out into 96 well plates in Human Melanocyte Basal Medium, Calcium Free (formerly Medium 254CF) (Thermo Fisher Scientific®) supplemented with Human Melanocyte Growth Supplement (HMGS (1 mL:500 media)(1 mL:500 mL media, Cat. No. S-002-5 from Thermo Fisher Scientific®) and Gentamicin/Amphotericin Solution (Thermo Fisher Scientific®) at a seeding density of 2000 cells/well. After 2 hours of cell attachment, the media was replaced with media containing the treatments and placed into and monitored with Incucyte® ZOOM (Sartorius®, Ann Arbor, MI) inside a 37° C. $CO_2$-incubator. All the wells are imaged every 3 hours for 72 hours total experiment time. Dendricity was measured using the dendrite length/cell body area metric from the Neurite Outgrowth 2015 Software Package (Sartorius®). The dendrite length (mm) and cell body areas ($mm^2$) were calculated by determining the mean from 24 separate wells per treatment group.

For determining the % reduction of dendricity, we subtract the dendricity value of the time zero from the dendricity value when the no treatment control hits 90% of the plateau level (delta control). At this "final" timepoint for the no treatment control, we subtract the dendricity values for each treatment (delta treatment). The % dendricity reduction is calculated using this equation: % inhibition=100-100*(delta treatment/delta control). Student's T-Test Function in EXCEL is used to calculate p-values between observed combination effects versus "expected" combination effect (sum of inhibition for each individual treatment)

EXAMPLES

The following examples are provided to help illustrate the skincare compositions described herein. The exemplified compositions are given solely for the purpose of illustration and are not to be construed as limitations of the present disclosure, as many variations thereof are possible without departing from the spirit and scope of the disclosure. All parts, percentages, and ratios herein are by weight unless otherwise specified.

The Example in Table 3, below, could be prepared by conventional methods of making skin care emulsions. The following examples could be made by combining the Phase A ingredients (e.g., glycerol, niacinamide, chelants, antioxidants, preservatives, and emulsifiers) in a container and mixing until uniform. The Phase B ingredients (e.g., oils including silicone oils and emulsifiers) can be combined in a separate container and mixed until uniform. Phase B can then be added to the Phase A and the resulting emulsion can be subjected to high shear mixing (e.g., Flacktek Speedmixer®, or rotor-stator mill). Finally, Phases C and D can be added to the emulsion and mixed until uniform, and then the pH adjuster, if present, is added and the product is subjected to high shear mixing until uniform.

TABLE 3

| Formula Example | |
|---|---|
| | (wt. %) |
| Phase A | |
| Water | Q.S. |
| Niacinamide | 1-5 |
| N-PKEK | 10-50 ppm |
| Dexpanthenol | 0.250 |
| Glycerol | 5 |
| Disodium EDTA | 0.1 |
| Phase B | |
| Dimethicone and Dimethiconol | 0.5 |
| Lauroyl Lysine | 1.000 |
| Isopropyl Isostearate | 5.000 |
| Isohexadecane | 1.000 |
| Cetyl Alcohol | 0.250 |

TABLE 3-continued

Formula Example

| | (wt. %) |
|---|---|
| PEG-100 Stearate | 0.200 |
| Stearyl Alcohol | 0.500 |
| Behenyl Alcohol | 0.400 |
| Hydroxyacetophenone | 0.150 |
| Phase C | |
| Hydroxyethyl acrylate/sodium acryloyldimethyltaurate copolymer | 2.000 |
| Phase D | |
| Benzyl alcohol | 0.250 |

Combinations:

A. A skin care composition comprising:
 a. a combination of a vitamin $B_3$ compound and nicotinoyl tetrapeptide-30 (N-PKEK)-acid [SEQ ID NO: 1] at a weight ratio of the niacinamide to the N-PKEK from about 1000:1 to about 5000:1; and
 b. a dermatologically acceptable carrier;
 c. wherein the combination of N-PKEK-acid [SEQ ID NO: 1] and vitamin B3 compound synergistically exhibits a dendricity reduction and exhibits a synergy factor greater than 1 according to the Melanocyte Dendricity Test Method as disclosed herein;
  wherein the vitamin $B_3$ compound comprises niacinamide.

B. A skin care composition comprising:
 a. a combination of a vitamin $B_3$ compound and nicotinoyl tetrapeptide-30 (N-PKEK) [SEQ ID NO: 1], derivatives thereof, or mixtures thereof at a weight ratio of the vitamin $B_3$ compound to the N-PKEK from about 100:1 to about 100,000:1; and
 b. a dermatologically acceptable carrier;
  wherein the combination of N-PKEK [SEQ ID NO: 1] and vitamin B3 compound synergistically exhibits a dendricity reduction and exhibits a synergy factor greater than 1 according to the Melanocyte Dendricity Test Method as disclosed herein.

C. The skin care composition according to Paragraph B, wherein the N-PKEK [SEQ ID NO: 1] comprises N-PKEK-acid and/or N-PKEK-amide.

D. The skin care composition according to Paragraphs B-C, wherein the ratio of vitamin $B_3$ to N-PKEK is from about 10:1 to 100,000:1, preferably from about 50:1 to about 50,000:1, more preferably from about 100:1 to about 10,000:1, more preferably from about 250:1 to about 10,000:1, even more preferably from about 500:1 to about 5000:1, and most preferably from about 1000:1 to about 5000:1.

E. The skin care composition according to Paragraphs A-D, wherein the synergy factor is ≥1.1, preferably ≥1.15, more preferably ≥1.2, even more preferably ≥1.25, and most preferably ≥1.3 according to the Melanocyte Dendricity Test Method as disclosed herein.

F. The skin care composition of according to Paragraphs A-E, wherein the weight ratio of vitamin B3 compound to N-PKEK-amide [SEQ ID NO: 1] is from about 7500:1 to about 12,500:1 and the combination exhibits a synergy factor of at least 3.5 according to the Melanocyte Dendricity Test Method as disclosed herein.

G. The skin care according to Paragraphs A-E, wherein the composition comprises a safe and effective amount of the vitamin $B_3$ compound.

H. The skin care according to Paragraphs A-F, wherein the composition comprises from about 0.1 wt. % to about 10 wt. % of the vitamin $B_3$ compound, preferably from about 0.5 wt. % to about 8 wt. % of the vitamin $B_3$ compound, more preferably from about 1 wt. % to about 7 wt. % of the vitamin B3 compound, even more preferably from about 1 wt. % to about 6 wt. % of the vitamin $B_3$ compound, even more preferably from about 2 wt. % to about 5 wt. % of the vitamin $B_3$ compound, even more preferably from about 1 wt. % to about 5 wt. % of the vitamin $B_3$ compound, and even most preferably from about 3 wt. % to about 4 wt. % of the vitamin $B_3$ compound I. The skin care composition according to Paragraphs B-G, wherein the vitamin $B_3$ compound is chosen from niacinamide, nicotinic acid, nicotinyl alcohol, or mixtures thereof.

J. The skin care composition according to Paragraph H, wherein the vitamin $B_3$ compound is niacinamide.

K. The skin care composition according to Paragraphs A-I, wherein the composition comprises a safe an effective amount of the N-PKEK [SEQ ID NO: 1].

L. The skin care composition according to Paragraphs A-J, wherein the composition comprises from about 0.01 ppm to about 100 ppm of the N-PKEK [SEQ ID NO: 1], preferably from about 0.1 ppm to about 75 ppm of the N-PKEK [SEQ ID NO: 1], more preferably from about 1 ppm to about 50 ppm of the N-PKEK [SEQ ID NO: 1], even more preferably from about 5 ppm to about 50 ppm of the N-PKEK [SEQ ID NO: 1], even more preferably from about 10 ppm to about 50 ppm of the N-PKEK [SEQ ID NO: 1], and most preferably from about 10 ppm to about 30 ppm of the N-PKEK [SEQ ID NO: 1].

M. The skin care composition according to Paragraphs B-L, wherein the N-PKEK [SEQ ID NO: 1] comprises N-PKEK-amide and the weight ratio of the vitamin B3 compound to N-PKEK-amide is from about 400:1 to about 50,000:1 and the combination exhibits a synergy factor of at least 1.3 according to the Melanocyte Dendricity Test Method as disclosed herein.

N. The skin care composition according to Paragraphs B-M, wherein the N-PKEK [SEQ ID NO: 1] comprises N-PKEK-amide and the weight ratio of the vitamin B3 compound to N-PKEK-amide is from about 1000:1 to about 10,000:1 and the combination exhibits a synergy factor of at least 1.4 according to the Melanocyte Dendricity Test Method as disclosed herein.

O. The skin care composition according to Paragraphs B-M, wherein the N-PKEK [SEQ ID NO: 1] comprises N-PKEK-amide and the weight ratio of the vitamin B3 compound to N-PKEK-amide is from about 5000:1 to about 15,000:1 and the combination exhibits a synergy factor of at least 3 according to the Melanocyte Dendricity Test Method as disclosed herein.

P. The skin care composition according to Paragraphs B-M, wherein the N-PKEK [SEQ ID NO: 1] comprises N-PKEK-amide and the weight ratio of the vitamin B3 compound to N-PKEK-amide is from about 7500:1 to about 12,500:1 and the combination exhibits a synergy factor of at least 3.5 according to the Melanocyte Dendricity Test Method as disclosed herein.

Q. The skin care composition according to Paragraphs A-P, further comprising at least one additional ingredient chosen from vitamins, minerals, peptides, sugar amines, sunscreen agents, oil control agents, flavonoid compounds, anti-oxidants, protease inhibitors, tyrosinase inhibitors, anti-inflammatory agents, moisturizing agents, exfoliating agents, skin lightening agents, anti-acne agents, anti-wrinkle agents, phytosterols, N-acyl amino acid compounds, antimicrobials, antifungals, pH adjustors, thickening agents, preservatives, or mixtures thereof; wherein the vitamins are not vitamin $B_3$ compounds and/or niacinamide.

R. The skin care composition according to Paragraphs A-Q, wherein the skin care composition comprises from about 50 wt. % to about 99 wt. % of the dermatologically acceptable carrier, preferably from about 60 wt. % to about 98 wt. % of the dermatologically acceptable carrier, more preferably from about 70 wt. % to about 98 wt. % of the dermatologically acceptable carrier, and even more preferably from about 80 wt. % to about 95 wt. % of the dermatologically acceptable carrier.

S. The skin care composition according to Paragraphs A-R, wherein the dermatologically acceptable carrier comprises water.

T. The skin care composition according to Paragraphs A-S, wherein the skin care composition is an oil-in-water emulsion.

U. The skin care composition according to Paragraphs A-T, wherein the skin care composition is a face wash, body wash, or leave-on skin care product.

V. The skin care composition according to Paragraph U, wherein the skin care composition is a leave-on skin care product, and the leave-on skin care product is a moisturizer or a treatment product.

W. A skin care composition for use in a method of treating skin, comprising:
 a. identifying a target portion of skin where treatment is desired;
 b. applying the composition according to Paragraphs A-V.

X. The method according to Paragraph W, wherein the composition is applied at least once per day for at least 2 weeks, preferably at least 4 weeks, more preferably at least 8 weeks, and most preferably at least 12 weeks.

Y. The method according to Paragraph W-X, wherein the target portion of skin comprises a dark spot and the composition fades the dark spot.

Z. The method according to Paragraph W-Y, wherein the composition brightens and/or evens the tone of the target portion of skin.

AA. Use of N-PKEK and niacinamide in a skin care composition according to Paragraphs A-V, for synergistically reducing the dendricity according to the Melanocyte Dendricity Test Method.

BB. Use of N-PKEK and niacinamide in a skin care composition according to Paragraphs A-V, to brighten and/or even skin tone.

CC. Use of N-PKEK and niacinamide in a skin care composition according to Paragraphs A-V, to fade one or more dark spots.

DD. Use of N-PKEK and niacinamide in a skin care composition according to Paragraphs A-V, to help reduce the appearance of spots and discoloration by regulating melanocyte dendricity The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

SEQUENCE LISTING

```
Sequence total quantity: 1
SEQ ID NO: 1            moltype = AA   length = 4
FEATURE                 Location/Qualifiers
source                  1..4
                        mol_type = protein
                        organism = Synthetic construct
SEQUENCE: 1
PKEK                                                              4
```

What is claimed is:

1. A skin composition comprising:
 a) a combination of niacinamide and nicotinoyl tetrapeptide-30 (N-PKEK) [SEQ ID NO: 1] at a weight ratio of the niacinamide to the N-PKEK from about 1000:1 to about 5000:1; and
 b) a dermatologically acceptable carrier:
 wherein at least a portion of the N-PKEK [SEQ ID NO: 1] comprises nicotinoyl tetrapeptide-30 acid (N-PKEK-acid); and
 wherein the combination of N-PKEK [SEQ ID NO: 1] and niacinamide synergistically exhibits a dendricity reduction and exhibits a synergy factor greater than 1.

2. The skin care composition of claim 1, wherein the composition comprises from about 10 ppm to about 50 ppm of the N-PKEK [SEQ ID NO: 1].

3. The skin care composition of claim 2, wherein the composition comprises from about 1% to about 5% of the niacinamide.

4. The skin care composition of claim 1, wherein the skin care composition is a face wash, body wash, or leave-on skin care product.

5. The skin care composition of claim 1, wherein the synergy factor is greater than 1.2.

6. The skin care composition of claim 1, further comprising at least one additional ingredient chosen from additional vitamins, minerals, peptides, sugar amines, sunscreen agents, oil control agents, flavonoid compounds, anti-oxidants, protease inhibitors, tyrosinase inhibitors, anti-inflammatory agents, moisturizing agents, exfoliating agents, skin lightening agents, anti-acne agents, anti-wrinkle agents, phytosterols, N-acyl amino acid compounds, antimicrobials, antifungals, pH adjustors, thickening agents, preservatives, or mixtures thereof.

7. The skin care composition of claim 4, wherein the skin care composition is a leave-on skin care product, and the leave-on skin care product is a moisturizer or a treatment product.

8. The skin care composition of claim 1, comprising about 10 ppm of the N-PKEK [SEQ ID NO: 1] and 5% of the niacinamide.

9. The skin care composition of claim 1, wherein the weight ratio of the niacinamide to the N-PKEK is about 5000:1.

10. A method of cosmetically treating skin comprising:
  a) identifying a target portion of skin comprising a dark spot; and
  b) applying an effective amount of the skin care composition of claim 1 onto the target portion of skin.

11. The method of claim 10, comprising applying the skin care composition at least once per day for at least two weeks.

12. The method of claim 10, wherein the skin care composition fades the dark spot.

13. A method of cosmetically treating skin comprising:
  a) identifying a target portion of skin in that requires brightening and/or evening tone; and
  b) applying an effective amount of the skin care composition of claim 1 onto the target portion of skin.

14. The method of claim 13, comprising applying the skin care composition at least once per day for at least two weeks.

15. The method of claim 13, wherein the skin care composition brightens and/or evens the tone of the target portion of skin.

* * * * *